United States Patent
Li et al.

(10) Patent No.: US 11,276,185 B2
(45) Date of Patent: Mar. 15, 2022

(54) TARGET TRACKING METHOD AND APPARATUS

(71) Applicant: HUAWEI TECHNOLOGIES CO., LTD., Guangdong (CN)

(72) Inventors: Zhigang Li, Shanghai (CN); Jianzhuang Liu, Shenzhen (CN); Li Qian, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 82 days.

(21) Appl. No.: 16/913,795

(22) Filed: Jun. 26, 2020

(65) Prior Publication Data
US 2020/0327681 A1 Oct. 15, 2020

Related U.S. Application Data

(63) Continuation of application No. PCT/CN2018/125157, filed on Dec. 29, 2018.

(30) Foreign Application Priority Data

Dec. 29, 2017 (CN) .......................... 201711479274.3
Dec. 21, 2018 (CN) .......................... 201811572062.4

(51) Int. Cl.
*G06T 7/70* (2017.01)
*G06T 7/246* (2017.01)
(Continued)

(52) U.S. Cl.
CPC ............ *G06T 7/251* (2017.01); *G06K 9/6256* (2013.01); *G06K 9/6267* (2013.01); *G06T 7/75* (2017.01); *G06T 2207/20081* (2013.01)

(58) Field of Classification Search
CPC . G06T 7/75; G06T 7/248; G06T 2207/30232; G06T 2207/30248; G06T 7/251; G06K 9/6256; G06K 9/627
See application file for complete search history.

(56) References Cited

U.S. PATENT DOCUMENTS

2013/0182947 A1   7/2013 Wang et al.
2016/0180543 A1   6/2016 Hall et al.

FOREIGN PATENT DOCUMENTS

CN      104077779 A    10/2014
CN      104346811 A    2/2015
(Continued)

OTHER PUBLICATIONS

Zhizhen Chi et al., Dual Deep Network for Visual Tracking. IEEE Transactions on Image Processing, vol. 26, No. 4, Apr. 2017, 11 pages.

*Primary Examiner* — Sam Bhattacharya
(74) *Attorney, Agent, or Firm* — Womble Bond Dickinson (US) LLP

(57) ABSTRACT

In one embodiment, a target tracking method includes: receiving a current frame of picture including a target object; determining, based on a drift determining model, whether a tracker drifts for tracking of the target object in the current frame of picture, where the drift determining model is obtained through modeling based on largest values of responses values of a training sample used to train the drift determining model, where the training sample is collected from a training picture that includes the target object, where the response value of the sample is a value indicating a probability that the training sample is the target object in the training picture; and outputting a tracking drift result, where the tracking drift result includes: drift is generated for the tracking of the target object, or no drift is generated for the tracking of the target object.

16 Claims, 7 Drawing Sheets

(51) Int. Cl.
     *G06T 7/73*           (2017.01)
     *G06K 9/62*           (2022.01)

(56) References Cited

FOREIGN PATENT DOCUMENTS

| | | |
|---|---|---|
| CN | 104850865 A | 8/2015 |
| CN | 106875428 A | 6/2017 |
| JP | 2015103103 A | 6/2015 |
| JP | 2016076791 A | 5/2016 |
| KR | 20170077545 A | 7/2017 |

TARGET TRACKING METHOD AND APPARATUS

CROSS-REFERENCE TO RELATED APPLICATIONS

This application is a continuation of International Application No. PCT/CN2018/125157, filed on Dec. 29, 2018, which claims priority to Chinese Patent Application No. 201711479274.3, filed on Dec. 29, 2017 and Chinese Patent Application No. 201811572062.4, filed on Dec. 21, 2018, The disclosures of the aforementioned applications are herein incorporated by reference in their entireties.

TECHNICAL FIELD

This application relates to the information processing field, and more specifically, to a target tracking method and apparatus.

BACKGROUND

Target tracking is a basic problem of computer vision, and is widely applied in actual life, such as self-driving, human-machine interaction, traffic management, intelligent video surveillance, and AR/VR. Through the target tracking, positions of a target of interest can be continuously captured. This is a problem that cannot be ignored in many artificial intelligence tasks. Specifically, the target tracking (or visual target tracking) means that in a video sequence, when a position of a target in the first frame is given, the position of the target can be found in all subsequent frames. However, due to impact of factors such as blocking, motion blurring, a light change, a target appearance change, a background being suspected as a target (similarity between a background and a target), and a scale change, a drift phenomenon easily occurs in a tracking process, that is, tracking with a tracker fails. Therefore, it is important and valuable to resolve the tracker drift problem.

At present, many target tracking methods are available in academic, and have different performance and different application scenarios. According to different principles, five major types of tracking algorithms may be classified into: foreground detection, feature description, Bayesian tracking, core tracking, and online learning and tracking. However, according to these algorithms, for a latest input picture, at most, only a target position can be provided, and accuracy of the output target position cannot be ensured. In other words, a tracker cannot perform self-checking on whether a tracked position is correct. Once the tracker drifts, the tracker outputs a wrong position. To make a tracker effect more stable and reliable, a detection module is added to the tracker in the prior art, and a tracking algorithm and a detection algorithm are combined to resolve a tracker drift problem caused by deformation, partial blocking, and the like in a tracking process. However, the detection algorithm is quite slow but tracking is quite fast, a real-time application effect of the tracker is quite poor. If there are a few more tracked targets, in actual application, such a tracker cannot work due to an excessively large computing amount.

SUMMARY

This application provides a target tracking method, apparatus, and system, to quickly find that a tracker drifts, and improve accuracy of target tracking.

According to a first aspect, a target tracking method is provided, and includes:

receiving a current frame of picture, where the current frame of picture includes a target object;

determining, based on a drift determining model, whether a tracker drifts for tracking of the target object in the current frame of picture, where the drift determining model is obtained through modeling based on largest values of responses of samples; the drift determining model is a probability density model; the sample is a training sample used to train the drift determining model, where the training sample is collected from a training picture, and the training picture includes the target object; and the response value of the sample is a probability value of likelihood that the training sample is the target object in the training picture; and outputting a tracking drift result, where the tracking drift result includes: drift is generated for the tracking of the target object, or no drift is generated for the tracking of the target object.

Therefore, in this embodiment of this application, determining, based on the drift determining model, whether the tracker drifts for tracking of the target object in the current frame of picture helps improve accuracy of target tracking. The drift determining model in this embodiment of this application is obtained through modeling based on largest sample response values (that is, the largest values of the responses of the samples). It is precisely because the drift determining model is obtained through modeling based on the largest sample response values that drift determining or drift detection can be quickly and accurately performed by using the drift determining model. A difference between the drift determining model in this embodiment of this application and an existing detection module is that the existing detection module is usually relatively complex, and a detection algorithm is very slow. This cannot meet a requirement for fast tracking. However, the drift determining model in this embodiment of this application can rapidly respond to and output a tracking result.

With reference to the first aspect, in a first implementation of the first aspect, before the determining, based on a drift determining model, whether a tracker drifts for tracking of the target object in the current frame of picture, the method further includes:

receiving a first picture, and providing a target coordinate position in the first picture, where the first picture is the first frame of picture;

receiving a second picture, where the second picture and the first picture are continuous on a time axis, determining a corresponding position in the second picture based on the target coordinate position in the first picture, and performing sampling at a periphery of the corresponding position in the second picture, to obtain N test samples, where N is a positive integer greater than 1 performing feature extraction on each sample in the N test samples, to obtain N feature representations $\{X_1, X_2, \ldots, X_n, \ldots, X_N\}$ that are in a one-to-one correspondence with the N test samples, where n represents an $n^{th}$ sample in the N test samples;

inputting the N feature representations $\{X_1, X_2, \ldots, X_n, \ldots, X_N\}$ into a classifier to obtain N response values $\{Y_1, Y_2, \ldots, Y_n, \ldots, Y_N\}$ in a one-to-one correspondence with the N feature representations $\{X_1, X_2, \ldots, X_n, \ldots, X_N\}$, where $Y_n = wX_n$, w indicates a core value of the classifier, and $Y_n$ is used to indicate a probability value of likelihood that the $n^{th}$ sample is the target object in the second picture; and performing modeling based on a largest sample response value $Y_{max}$ in the N response values $\{Y_1, Y_2, \ldots, Y_n, \ldots, Y_N\}$, to obtain the drift determining model.

As described above, modeling is performed based on many largest sample response values of many frames of training pictures, to obtain the drift determining model. Whether drift is generated in current tracking can be quickly detected by using the model, making important contributions to self-checking of the tracker and subsequent drift correction, thereby greatly improving tracking accuracy of the tracker.

With reference to the first aspect or the first implementation of the first aspect, in a second implementation of the first aspect, the determining, based on a drift determining model, whether a tracker drifts for tracking of the target object in the current frame of picture includes:

determining whether a largest sample response value in the current frame of picture falls outside a most probable interval constructed by the drift determining model; and if yes, determining that drift is generated; or if not, determining that no drift is generated, where the largest sample response value in the current frame of picture is a largest sample response value in a plurality of sample response values corresponding to a plurality of samples sampled in the current frame of picture.

With reference to any one of the first aspect, or the first or the second implementation of the first aspect, in a third implementation of the first aspect, when the tracking drift result is that drift is generated for the tracking of the target object, the method further includes:

obtaining a corresponding position in the current frame of picture based on a position of the target object in a previous frame of picture, and establishing a plurality of search windows near the corresponding position;

collecting samples in each of the plurality of search windows to obtain a sample set corresponding to each search window, and computing a sample response value of each sample in the sample set;

determining, based on top k sample response values in each search window, a target search window in which the target object is most likely to appear, where the top k sample response values are k sample response values that are ranked top in descending order of sample response values;

sampling the current frame of picture based on the target search window, to obtain a plurality of sampling samples; and separately computing sample response values of the plurality of sampling samples to obtain a plurality of sampling sample response values; and determining a sampling sample corresponding to a largest sample response value in the plurality of sampling sample response values as the target object in the current frame of picture.

As described above, in this embodiment of this application, the drift generated by the tracker in a target tracking process is detected in time by using the drift determining model, and the drift is corrected in time by using a coarse-fine process, thereby ensuring accuracy of the tracker, providing fast and accurate input information for a downstream device of the tracker, so that the downstream device of the tracker can make more accurate determining.

With reference to the third implementation of the first aspect, in a fourth implementation of the first aspect, the determining, based on top k sample response values in each search window, a target search window in which the target object is most likely to appear includes:

entering the top k sample response values in each search window into a statistical function, to obtain statistical function values of the top k sample response values, and determining, by comparing the statistical function values of the top k sample response values, the target search window in which the target object is most likely to appear.

With reference to the fourth implementation of the first aspect, in a fifth implementation of the first aspect, the entering the top k sample response values in each search window into a statistical function, to obtain statistical function values of the top k sample response values, and determining, by comparing the statistical function values of the top k sample response values, the target search window in which the target object is most likely to appear includes:

$$\hat{z}_j = (\text{argmax or argmin})_{z_i} \varphi(F_1(z_i) \ldots F_k(z_i))$$

where $F_m(.)$ is an $m^{th}$ largest value of response values sorted in descending order in a corresponding response graph $F(.)$, $\varphi(.)$ is a statistical function, and the statistical function may be sum calculation, product calculation, median value calculation, average value calculation, variance calculation (where when the statistical function is variance calculation, a smaller value of the statistical function is preferred), or the like.

With reference to any one of the first aspect or the first or the second implementation of the first aspect, in a sixth implementation of the first aspect, when the tracking drift result is that no drift is generated for the tracking of the target object, the method further includes: updating the drift determining model based on the tracking drift result.

Specifically, before the updating the drift determining model based on the tracking drift result, the method further includes: outputting the position of the target object in the current frame of picture.

Correspondingly, the updating the drift determining model based on the tracking drift result includes:

updating the drift determining model based on the position of the target object in the current frame of picture.

According to a second aspect, a target tracking apparatus is provided, and is configured to perform any one of the first aspect or the implementations of the first aspect. Specifically, the apparatus may include a module configured to perform the method according to any one of the first aspect or the implementations of the first aspect.

According to a third aspect, a tracker is provided. The tracker includes a processor and a memory.

The memory stores a computer-readable program.

The processor runs the program in the memory, to implement the method according to any one of the first aspect or the implementations of the first aspect.

According to a fourth aspect, a computer-readable storage medium is provided, where the computer-readable storage medium stores a computer program, and the computer program enables a device to perform the method according to any one of the first aspect or the implementations of the first aspect.

According to a fifth aspect, a computer program product is provided. The computer program product includes a computer program (which may also be referred to as code or an instruction). When being run, the computer program enables a computer to perform the method according to any one of the first aspect or the implementations of the first aspect.

According to a sixth aspect, a chip is provided, where the chip includes a processor and a data interface, and the processor reads, through the data interface, an instruction stored in a memory, to perform the method according to the first aspect.

In one embodiment, the chip may further include the memory. The memory stores the instruction, the processor is configured to execute the instruction stored in the memory, and when executing the instruction, the processor is configured to perform the method according to the first aspect.

In the embodiments of this application, a drift status of the tracker is detected in real time by using the drift determining model. The drift determining model is obtained by modeling the largest sample response values. The drift status of the tracker can be quickly found by using the drift determining model, so that accurate input information is provided for correction of the tracker. This helps obtain a more accurate tracking result. Therefore, regardless of in a self-driving scenario or in a video surveillance scenario, a more accurate tracking result helps with a subsequent process, thereby finally improving user experience.

DESCRIPTION OF EMBODIMENTS

Target tracking is one of focuses in the field of computer vision research and is widely applied. A target tracking technology needs to be used for tracking focusing of the camera, automatic target tracking of an unmanned aerial vehicle, and the like. In addition, there is also tracking of a specific object, for example, human body tracking, vehicle tracking in a traffic monitoring system, face tracking, and gesture tracking in an intelligent interaction system.

In brief, the target tracking is establishing, in a continuous video sequence, a target position relationship of a to-be-tracked object, to obtain a complete motion trajectory of the target object. If a target coordinate position in the first frame of an image is given, an exact position of a target in a next frame of the image is computed. In a motion process, a target may present some changes on an image, such as a posture or shape change, a scale change, a background blocking change, or a light intensity change. Such changes often cause tracking drift, that is, an error occurs during positioning of a target position. This application is intended to detect drift in time in a target tracking process, and a result of the detection may be used to correct the drift, thereby improving precision of target tracking.

Figure 1:
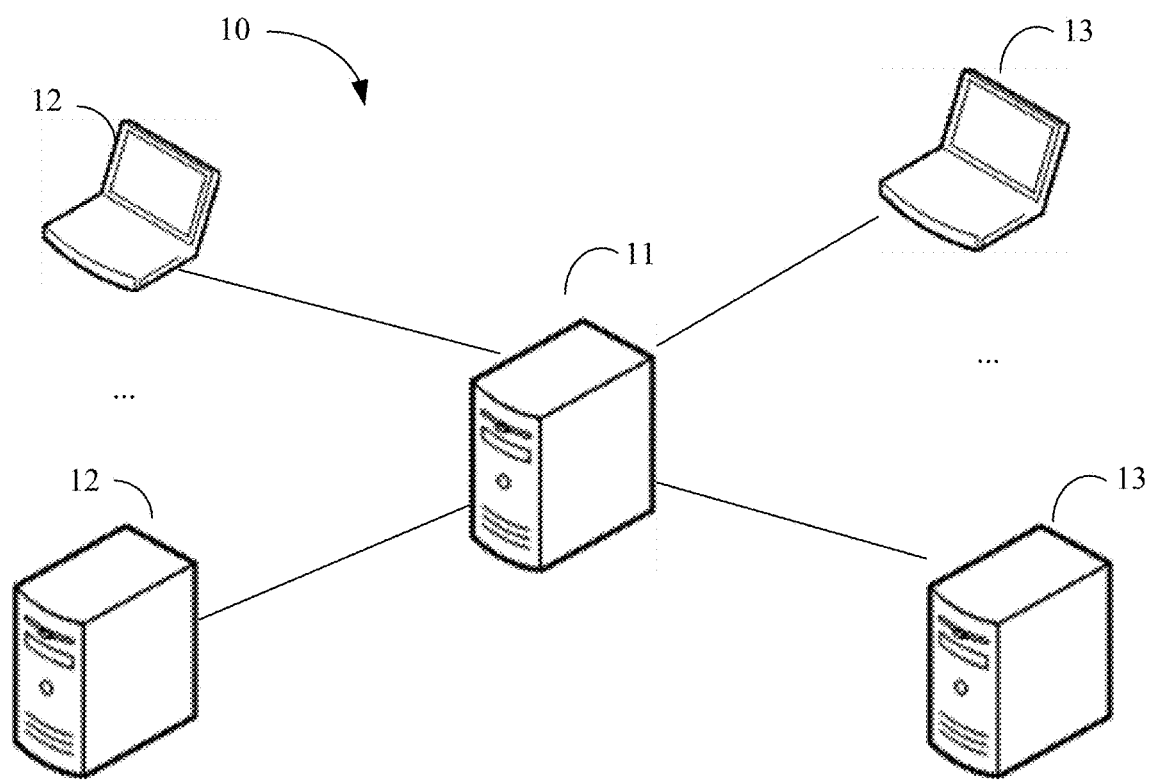
FIG. 1 is a schematic diagram of a system architecture to which a target tracking method and apparatus are applicable according to an embodiment of this application.

FIG. 1 is a schematic diagram of a communications system 10 to which a target tracking method and apparatus are applicable according to an embodiment of this application. As shown in FIG. 1, the communications system 10 may include a server device 11. The server device 11 may be configured to perform target tracking on received data (that is, a current frame of picture, for example, a frame of picture in a to-be-tracked video sequence). In one embodiment, a model training module may be deployed in the server device 11, or the server device 11 may be a server cluster or a cloud server. The model training module is configured to train a drift determining model, so that after receiving a picture on which target tracking is to be performed, the server device 11 tracks a target in the picture by using the trained drift determining model. Specifically, a classifier may be deployed in the model training module, and is configured to obtain a response value of a feature in the picture in a model training process. A core value w in the classifier may be updated based on a tracking result. In this embodiment of this application, the server device 11 may be configured to determine to train and continuously update the drift determining model, and the server device 11 may be further configured to determine, based on the trained drift determining model, whether drift is generated during the target tracking in the current frame, that is, whether an output target position is a real position of the target in the current frame of picture. The following describes a specific function of the server device 11 in detail with reference to a specific embodiment.

In one embodiment, the communications system 10 further includes a data receiving device 12, configured to receive to-be-processed data and transmit the to-be-processed data to the server device 11. Specifically, the data receiving device 12 may obtain the to-be-processed data through manual input, network search, or the like.

In one embodiment, the communications system 10 further includes a client device 13, configured to perform next-step target tracking processing by using a processing result from the server device 11. For example, when determining that drift is generated during the tracking, the client device 13 may correct the drift. Certainly, in this application, a correction process may alternatively be performed by the server device 11. It should be noted that, in addition to the correction process, in this application, the server device 11 may further output the trained drift determining model to the client device 13, and the client device 13 determines, based on the drift determining model, whether drift is generated during the target tracking. In other words, in this application, a program of determining whether the drift is generated and a program of correcting the drift after the drift is generated may both be implemented in the server device 11, or may both be implemented in the client device 13, or may be separately implemented by the server device 11 and the client device 13. This is not limited herein.

It should be understood that functions of the server device, the data receiving device, and the client device that are listed above are merely examples, and should not constitute any limitation on this application. Functions of the data receiving device and the client device may also be implemented by the server device. This is not limited in this application.

In addition, it should be further understood that deployment of the server device, the data receiving device, and the client device is not particularly limited in this application. For example, the server device, the data receiving device, and the client device may be deployed in different physical devices, and the different physical devices respectively implement corresponding functions of the server device, the data receiving device, and the client device. The server device, the data receiving device, and the client device that are deployed in the different physical devices may be connected by using a network. Alternatively, the server device, the data receiving device, and the client device may be deployed in a same physical device, and functions of the server device, the data receiving device, and the client device are implemented by using the physical device. Alternatively, the data receiving device and the client device may be integrated into a same terminal device or in different terminal devices, and are separately deployed in a same physical device together with the terminal device, so that the physical device implements respective functions.

It should be understood that the communications system shown in FIG. 1 is merely described as an example, and should not constitute any limitation on this application. Quantities and deployment manners of server devices and client devices are not particularly limited in this application. For example, there may be one or more server devices, that is, a plurality of server devices may form a server cluster.

In this embodiment of this application, the server device may be a server, and may include a processor, a hard disk, a memory, a system bus, and the like. Composition of the server device is similar to an architecture of a general-purpose computer. Because the server device needs to provide a highly reliable service, the server device may have a higher requirement in terms of processing capability, stability, reliability, security, scalability, manageability, and the like.

It should be understood that the client device may also be referred to as a terminal device, user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The client device in the embodiments of this application may be a mobile phone, a tablet computer (Pad), a computer with a wireless sending/receiving function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. In this application, the foregoing client device and a chip that may be disposed in the foregoing client device are collectively referred to as client devices.

It should be further understood that, when the server device, the data receiving device, and the client device are deployed in different physical devices, the server device, the data receiving device, and the client device may directly communicate with each other by using a network such as an Ethernet (for example, through a communications cable such as an optical fiber). Alternatively, the server device, the data receiving device, and the client device may indirectly communicate with each other by using a forwarding network including one or more network devices. Alternatively, the server device, the data receiving device, and the client device may communicate with each other by using a radio access network.

In addition, the radio access network may use various communications systems, for example, a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, an LTE frequency division duplex (FDD) system, an LTE time division duplex (TDD), a universal mobile telecommunications system (UMTS), a worldwide interoperability for microwave access (WiMAX) communications system, and a next-generation communications system (for example, a fifth-generation (5G) communications system), a convergence system of a plurality of access systems, an evolved system, or the like. The 5G system may also be referred to as a new radio (NR) access technology system.

It should be further understood that the communications system shown in FIG. 1 is an application scenario of the embodiments of this application, and should not constitute any limitation on this application. For example, the communications system may further include another device.

Figure 2:
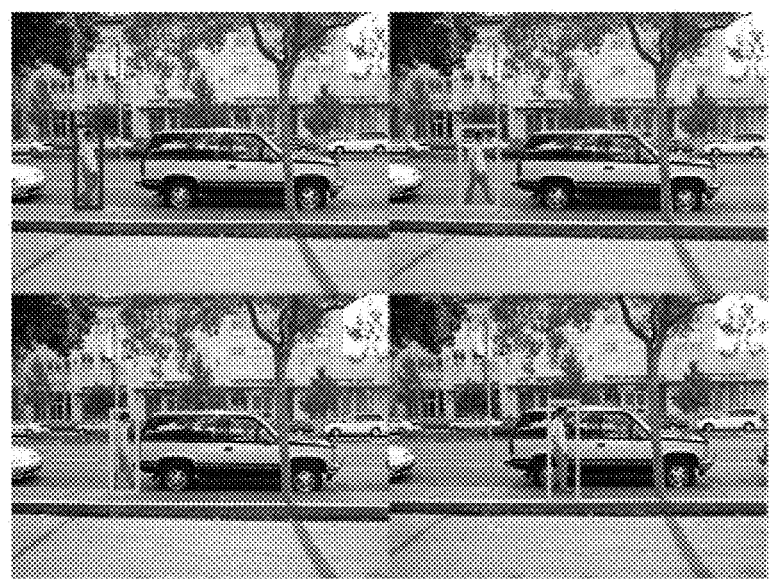
FIG. 2 is a schematic diagram of a physical object in a target tracking process according to an embodiment of this application.

Through brief descriptions in the foregoing, a concept of target tracking and related research are further described herein with reference to the accompanying drawings. Specifically, the target tracking means that in a continuous video sequence, on the premise that a coordinate position of a target in the first frame is given, positions of the target in all subsequent frames can be found. As shown in FIG. 2, if the first frame of picture (the upper left picture) and an initial position (shown by a rectangular box on the picture) of a target are given, positions of the target (shown by a rectangular box in each picture) are given in next several frames of pictures (on the upper right, lower left, and lower right) by the tracker.

Figure 3:
FIG. 3 is a schematic diagram of a physical object for which tracking drift occurs in a target tracking process according to an embodiment of this application.

However, due to impact of factors such as blocking, motion blurring, a light change, a target appearance change, a background being suspected as a target, and a scale change, a tracking drift phenomenon easily occurs in a tracking process, that is, tracking with a tracker fails. A tracked target on a picture (on the upper left) shown in FIG. 3 is a toy tiger, where a box on the left of the picture is a real position that is of the target and that is manually calibrated in a test set, and a box on the right is a target position tracked by a tracker. In the tracking process, the target is blocked by the external environment, causing the tracker to drift. In the figure (on the upper right, lower left, and lower right), the tracker is caused to drift respectively due to motion blurring, intensive light, and a background being suspected as a target.

Target tracking is one of focuses in the field of computer vision research and is widely applied. A target tracking technology needs to be used for tracking focusing of the camera, automatic target tracking of an unmanned aerial vehicle, and the like. In addition, there is also tracking of a specific object, for example, human body tracking, vehicle tracking in a traffic monitoring system, face tracking, and gesture tracking in an intelligent interaction system.

Since the target tracking is applied widely, and it is common that a tracker generates tracking drift in a tracking process, this application provides a target tracking method, to quickly find tracking drift, to ensure both real-time tracking and tracking accuracy of a tracker. Further, when it is found that a tracker drifts, the target tracking method provided in this application can further correct the drift of the tracker in time, so that the tracker can effectively run for a long time, and accuracy of target tracking is greatly improved.

It should be noted that, through efforts made by scientists in the past few decades, research on the target tracking is made from classic tracking methods such as Meanshift, particle filtering, and Kalman filtering to a method based on detection (Track By Detection) or correlation filtering, achieving a tremendous development, and appearance of an online learning method further helps the target tracking reach a new step.

For ease of understanding, a tracking process of an online learning tracker is first described briefly.

1. Picture Input

For example, a common video camera is used to capture a picture (such as 30 FPS) at a fixed frequency, and transmit the captured picture for a next step. It should be noted that, in the target tracking method shown in this application, continuity between collected pictures is a precondition for tracking.

2. Sampling

Because pictures captured by a camera have continuity, positions of a target in two consecutive frames of pictures do not differ greatly. As described above, in a continuous video sequence (which are expressed as consecutive picture frames herein), first, a target coordinate position on the first frame of picture is given. When a new picture is input, a tracker determines a target position on the new picture, the target position corresponds to the target coordinate position on the first frame of picture, and sampling is performed in a specific range (for example, a preset search window) around the target position, to obtain a batch of test samples. For example, a central point of the first frame of picture is used as an origin of a coordinate system, a rightward direction is a positive direction of an X axis, a leftward direction is a negative direction of the X axis, an upward direction is a positive direction of a Y axis, and a downward direction is a negative direction of the Y axis. It is assumed that a target coordinate position of a target object on the first frame of picture is (2, 3). For brevity, only one coordinate point is used as an example herein, and an actual target coordinate position may have a plurality of coordinate points. Therefore, on the foregoing new picture, coordinates of the target position are also (2, 3). Sizes of image frames in a same video sequence are the same. Therefore, assuming that in a same coordinate system, coordinates of corresponding positions can be absolutely obtained. Details are not described below again.

Figure 4:
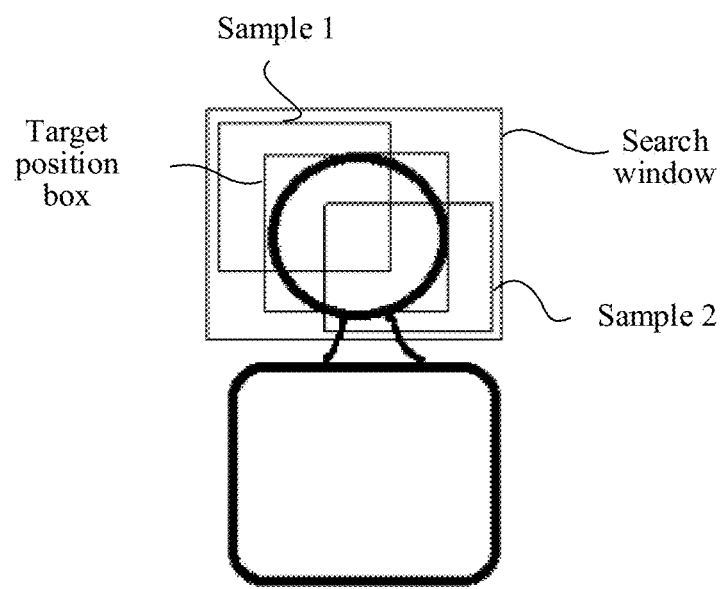
FIG. 4 is a schematic diagram of sampling in a target tracking method according to an embodiment of this application.

As shown in FIG. 4, the thick line is a human body contour, and the circle represents a human face. In the figure, a smallest box (a target position box) that exactly includes the human face is a target coordinate position on the first frame of picture, in a figure with the human face as a center, a largest box in the figure is a search window formed around the target coordinate position on the first frame of picture (where it should be noted that, a center of a search window in a current frame is usually a center of a target coordinate position in a previous frame of picture, a size of the search window is in direct proportion to a target size, and different shapes may be defined for different search windows, and may be rectangular, circular, or of another shape). Then the target position box determined in the previous frame is slid in various directions in the search window, to form a batch of samples. For example, the other two boxes in FIG. 4 are two samples obtained in such a sampling manner.

It should be noted herein that there may be a plurality of sampling manners. For example, sampling may be performed in a multi-scale sampling manner, where the multi-scale sampling manner is scaling a target position box determined in a previous frame at a specific ratio (including a plurality of proportions) and then sampling the target position box, so that scale adaptation can be implemented when a tracker outputs a target. A sampling method is not limited in this application.

3. Feature Extraction

Feature extraction is performed on each of the batch of samples obtained through sampling. Common features include a histogram of oriented gradient (HOG), a local binary pattern (LPB) feature, and a combination of a plurality of features. After feature extraction, each sample may be represented by a feature of the sample as $X=[x1, x2 \ldots xn]$, where $x1, x2, \ldots$ denote different features of X.

4. Sample Response

After a feature representation of each sample is obtained, the tracking problem is converted into a regression problem, which is specifically:

$$y=wx.$$

As described above, x herein is a sample represented by a sample feature, w is a core value of a classifier, and y is a sample regression value, and is also referred to as a response value, where a value range of the response value is between [0, 1]. A larger value of y indicates a higher probability that a sample corresponding to the value becomes a target in this frame of picture.

It should be noted that the classifier is obtained through training after positive and negative sampling is performed on a previous frame. Because a target coordinate position is given on the first frame of picture, a corresponding value of w is obtained after positive and negative samples are sampled. The value of w is updated by training the classifier. For example, when the first frame of picture is input, positive and negative samples are sampled based on a target coordinate position on the first frame of picture, and corresponding w is obtained based on the positive and negative samples. Herein, w is represented as w1. After a next frame of the first frame is tracked, positive and negative samples are re-sampled based on a target coordinate position obtained through tracking of the frame, and w1 is updated based on the positive and negative samples obtained through the re-sampling, to obtain w2. Then, a next frame is tracked, and so on.

5. Largest Response Value

Through the foregoing operation, a series of regression values y corresponding to sampling samples in each frame of picture may be obtained. A sample corresponding to a largest regression value $Y_{max}$ in the series of regression values y of each frame of picture is: A target coordinate position tracked by the tracker in the frame of picture. Therefore, a process of tracking each frame of picture by the tracker may be understood as a process of looking for a sample corresponding to a largest response value. Because each frame of picture has a largest sample response value, this embodiment of this application is intended to perform modeling based on these largest sample response values to obtain a model, and determine, by using the obtained model, whether the tracker drifts. A specific modeling manner and a manner of determining tracking drift by using the model are described in detail below.

Figure 5:
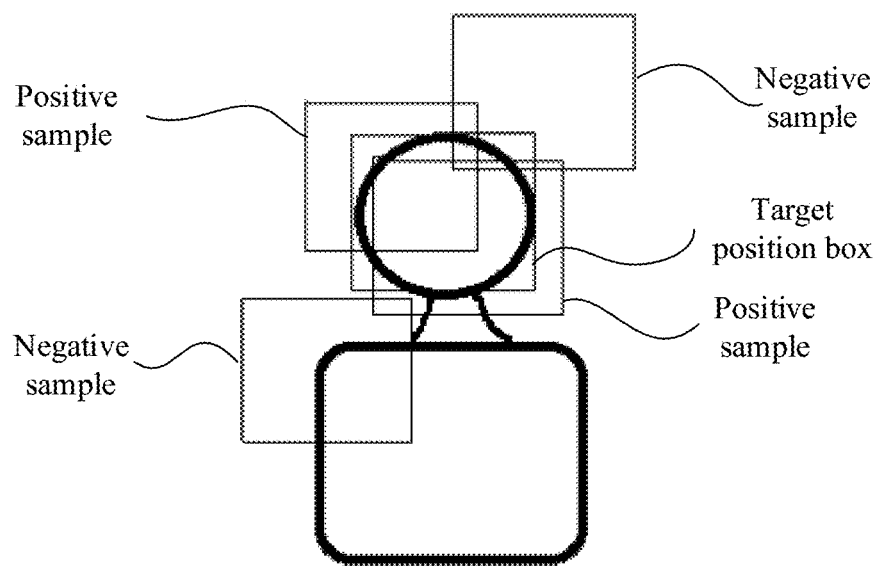
FIG. 5 is a schematic diagram of positive and negative samples in a target tracking method according to an embodiment of this application.

6. Outputting a Target Coordinate Position Corresponding to the Largest Response Value, and Updating the Classifier and a Target Template In the foregoing operation, for each frame of picture, a sample corresponding to the largest response value of the frame of picture is found, and the sample is used as a target coordinate position on the frame of picture. A frame of picture is used as an example. Herein, the frame of picture may be referred to as a first picture. After a sample corresponding to a largest response value of the first picture is found, a target coordinate position on the first picture is determined based on a coordinate position of the sample. Then, a specific quantity of positive samples are collected around the target coordinate position on the first picture, a specific quantity of negative samples are collected at a position that is far away from the target coordinate position on the first picture, and the classifier is updated based on the collected positive samples and negative samples, to obtain an updated value of w. It should be noted that, based on the foregoing distance, both the positive samples and negative samples are obtained from the first picture, and "around the target coordinate position" or "far away from the target coordinate position" is relative. Specific coordinate ranges of "around" and "far away" are not limited in this application. However, it may be understood that, usually, the positive samples and a box corresponding to the target coordinate position overlap relatively largely, where overlapping is above 0.5, and the negative samples and the box corresponding to the target coordinate position overlap relatively slightly, where overlapping is from 0 to 0.2. Specifically, it can be learned from FIG. 5 that, in FIG. 5, a box exactly holding a human face, that is, a box using the human face as a center, is a box (a target position box) corresponding to a target coordinate position of this frame of picture. Several boxes that overlap relatively largely with the box are positive samples, several boxes that overlap relatively lightly with the box are negative samples. In addition, the box corresponding to the target coordinate position is merely an example described in FIG. 5. As described above, in actual application, the box may be a square box, a rectangular box, a circular box, or a box in another shape. This is not limited in this application.

The first picture is still used as an example. When the classifier is updated, the target template is updated by using the sample corresponding to the largest response value of the first picture. The target template described herein is a template of the target object in a picture. The target template is continuously updated based on a sample corresponding to a largest sample response value obtained through each tracking, so that the target template is continuously perfected, and the tracker is more robust.

After all these operations, tracking of the first picture is completed, and an updated classifier and an updated target template that are obtained based on a tracking result of the first picture are also obtained. A next frame of picture is then tracked based on the updated classifier and the updated target template. A manner of processing a next frame of picture is the same as a manner of processing the first picture, so that tracking processing is performed sequentially on consecutive picture frames in a video sequence, to continuously update the classifier and the target template.

The foregoing is a brief process description of the online learning tracker provided in this embodiment of this application. Because the classifier and the target template are continuously updated in this solution, robustness of the classifier and the target template is relatively good, having a particular capability of resisting non-rigid deformation of the target in a tracking process. Further, in this application, modeling is performed based on the largest response value of each frame, and whether a tracker drifts is detected in time by using the built model. The tracking method provided in this application enables the tracker to have relatively high accuracy. In another embodiment of this application, after it is detected that a tracker drifts, a position at which a target most probably appears may be precisely determined by using a coarse-fine method, thereby effectively correcting drift of the tracker. In this way, the tracker can effectively run for a long time, and accuracy of target tracking is greatly improved.

Figure 6:
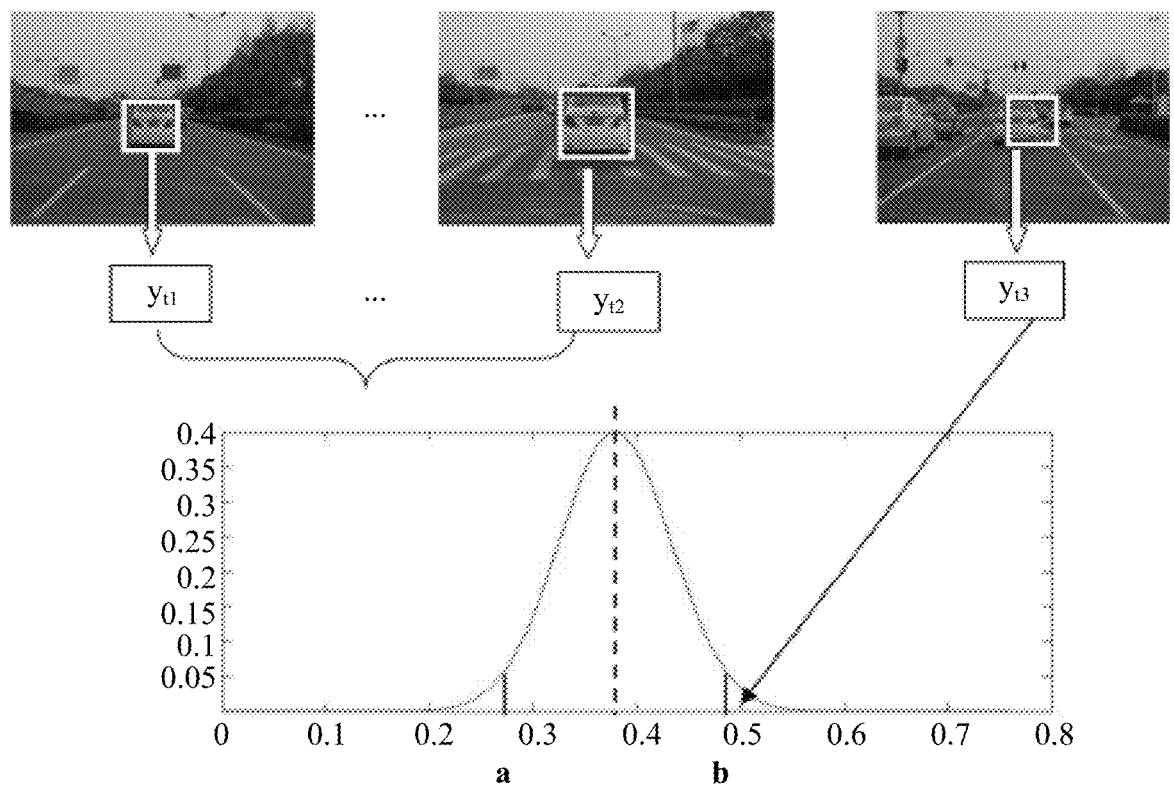
FIG. 6 is a schematic diagram of drift determining in a target tracking method according to an embodiment of this application.

For the foregoing "performing modeling based on the largest response value of each frame, and detecting, in time by using the built model, whether a tracker drifts", refer to FIG. 6.

In FIG. 6, for a series of consecutive pictures, a box in the first frame of picture in the figure represents a target coordinate position tracked at a moment t1, and after a period of time (represented by . . . in the figure), a box in the second frame of picture in the figure represents a target coordinate position tracked at a moment t2, a largest sample response value in the first frame of picture (that is, the moment t1) is $y_{t1}$, and a largest sample response value in the second frame of picture (that is, the moment t2) is $y_{t2}$. Largest response values such as $y_{t1}, \ldots,$ and $y_{t2}$ corresponding to a series of consecutive moments from the moment t1 to the moment t2 are modeled. Then, a parabolic graph (where the parabolic graph may be a normal distribution graph) shown in FIG. 6 may be obtained by using the built model.

In a subsequent tracking process, for example, after a largest response value $y_{t3}$ of a picture frame corresponding to a moment t3 in FIG. 6 is obtained, $y_{t3}$ is matched by using the built model. When $y_{t3}$ falls outside a most probable interval of the parabolic graph of the built model, it is considered that the response value $y_{t3}$ in this case does not belong to the model, and it is considered that the tracker drifts at the moment t3. Further, the drift may be corrected. An area surrounded by a vertical line a, a vertical line b, a curve, and a coordinate axis in the figure is the most probable interval. It should be noted that the most probable interval herein may be preset based on a precision requirement for the tracker. Using a model in FIG. 6 as an example, for a tracker with a higher precision requirement, values of horizontal coordinates corresponding to the vertical lines a and b are closer to a central axis of the curve.

It should be noted that, the normal distribution graph herein is obtained by using an example in which the model is a single-Gaussian model. When an initially model is another model, the model may not necessarily be presented as a parabolic graph, or may be presented as another corresponding graph. This is not limited in this embodiment of this application.

To more completely understand the application scenario of this solution, the following describes an application scenario in which this application may be used, to help understand application of the solution.

Application Scenario 1: Self Driving (and Assisted Driving)

Self-driving (and assisted driving) is a very hot topic at present. With economic development, a quantity of automobiles in the world increases continuously, and a vehicle accident rate also increases greatly, bringing a huge threat to life and property of people. Human factors are main factors that cause traffic accidents. How to reduce human errors is an important issue in improving driving safety. Therefore, an advanced driving assistant system (ADAS) and an autonomous driving system (ADS) attract attention of major companies around the world. For example, huge amounts of money are invested by corporations such as Google, Tesla, Uber, and Baidu to research, develop, and deploy related technologies. Because video cameras are at lower price relative to hardware devices such as lasers, it is a research and development direction of many companies to construct a perception system centered on visual perception.

Figure 7:
FIG. 7 is a schematic diagram of a self-driving application scenario of a target tracking method according to an embodiment of this application.

FIG. 7 shows a road surface photographed by a front-facing video camera on a self-driving vehicle. A main objective of visual perception is to detect, in a picture, positions of front key obstacles (a person and a vehicle in a box) in the picture and in a vehicle body coordinate system.

Figure 8:
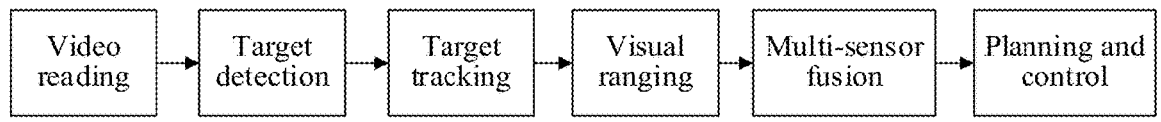
FIG. 8 is a schematic system diagram of a self-driving application scenario of a target tracking method according to an embodiment of this application.

FIG. 8 shows several main components of a self-driving system that uses a vision-centered perception system.

1. Video Reading

A plurality of cameras are installed on the top of a self-driving vehicle, to photograph a driving road surface from a plurality of orientations. Then, pictures are sent to a visual detection module. Usually, a video camera collects pictures at a speed of 30 Hz.

2. Target Detection

The visual detection module performs key obstacle detection, lane line detection, and traffic light detection on an input picture, and provides a position of a corresponding target on the picture. A key obstacle is a defined vehicle, pedestrian, or the like. Currently, deep learning achieves a good effect in a direction such as pedestrian detection. Therefore, a convolutional neural network is usually used to perform target detection. However, due to a limited hardware condition, a current target detection neural network cannot meet a real-time requirement while ensuring that an effect meets a requirement. Therefore, target tracking needs to be added to ensure real-time performance of visual perception.

3. Target Tracking

The target tracking can overcome a weak point of a low target detection speed, and can smooth a detection result. Therefore, the target tracking is a very important part of the visual perception module. Commonly used trackers include a compressive tracker (CT), a spatio-temporal context (STC) tracker, a kernelized correlation filter (KCF) tracker, a Struck tracker, a CSK tracker, and the like. Usually, a speed of a tracker can reach 30 to 60 FPS, and some even up to 200 to 300 FPS. However, in a real tracking scenario, many trackers cannot perform self-checking on tracking accuracy. Once a tracker drifts, an incorrect position is output. In self driving, outputting an incorrect position means that a vehicle is output in a place where there is no vehicle, directly affecting proper decision making by planning and control component. Therefore, it is quite important to find and correct drift of a tracker in time. The method provided in this application is intended to improve a vision perception part of self-driving, and detect in time tracking drift occurring in a tracking process of a tracker, to release in real time a target that has been out of the view, and ensure accuracy of an output result.

4. Visual Ranging

Ranging a target detected on an image is: For a target on each visually detected image, a distance between the target and a vehicle in a real scenario is obtained according to a visual ranging principle. In visual detection, only a position of a target in an image coordinate system can be detected, and a distance within which there is a person or a vehicle in a real three-dimensional scenario can be fed back to the planning and control component only through visual ranging. Currently, most visual ranging principles are based on a grounded point, and are greatly affected by shaking of a visual detection box. However, the target tracking described in the previous part 3 can smooth a visual detection result, making visual ranging more accurate.

5. Multi-Sensor Fusion

A video camera is only one of sensors, and desirable existence information of a key obstacle can be provided through visual perception. However, precise obstacle speed information cannot be provided. Other sensors such as Ibeo can better obtain obstacle speed information. Comprehensive information (a position, a category, a speed, and a driving direction) of a key obstacle on a driving road surface can be accurately provided through fusion of a plurality of sensors. The multi-sensor fusion is also an important part of self-driving.

6. Planning and Control

Functions of the component are as follows: Proper path planning and proper state control of an unmanned vehicle are performed by using comprehensive obstacle information that is output through multi-sensor fusion.

This part determines how an unmanned vehicle travels, and is a control center of a self-driving vehicle.

Visual target tracking is applied to a sensing module of self-driving (assisted driving), and can overcome a weak point of a non-real-time speed of a detector and output a smooth target position, to improve ranging precision, provide an ID for an obstacle for speed measurement, and the like. Therefore, the visual target tracking is an indispensable part of a vision-centered sensing module in self driving (assisted driving). The method provided in this patent is applied to a visual perception part of a self-driving module, and can detect drift of a tracker in time, so that a visual perception output result is more accurate.

Application Scenario 2: Intelligent Video Surveillance

With increasing demands for security defense and an onsite recording and alarm system in fields such as banking, electric power, transportation, security check, and military facilities, requirements for monitoring product quality are increasingly high. Video surveillance is widely applied in various aspects of production and life. An intelligent video surveillance system has been widely used in public places such as banks, shopping malls, stations, and road intersections.

Figure 9:
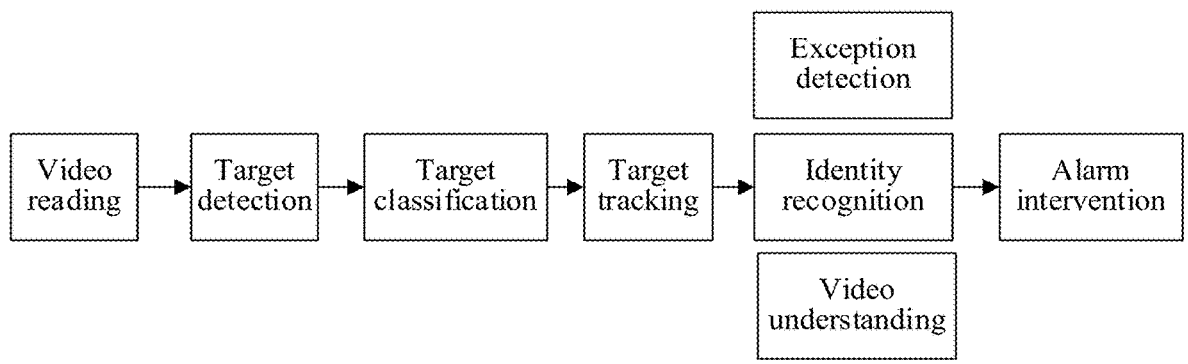
FIG. 9 is a schematic system diagram of a video surveillance application scenario of a target tracking method according to an embodiment of this application.

FIG. 9 shows several main components of intelligent video surveillance.

1. Video Reading

In a related scenario, a camera is installed to perceive a monitoring range, and a picture obtained through photographing is sent to a target detection module. Usually, a video camera collects pictures at a speed of 30 Hz.

2. Target Detection

This part mainly detects a motion target, to be specific, a change area is detected in a sequence image, and the motion target is extracted from a background image. For post-processing processes such as target classification, tracking, and behavior understanding, only a pixel area that is in an image and that corresponds to a motion target is considered.

Correct detection and segmentation of the motion target are very important for post-processing.

3. Target Classification

This part is to separate out a target of interest. For example, at the door of a bank, a vehicle is not a primary goal of interest; instead, a person is a primary goal of interest. In this part, a focused target is separated out based on different objects of interest in scenarios.

4. Target Tracking

The target tracking can overcome a weak point of a low target detection speed, and can correlate a same target in consecutive frames for further analysis. This part can ensure real-time running of the system. The method provided in this application is applied to this part, to detect and correct drift of a tracker in time, so that a perception result is accurately transferred to a next processing module.

5. Video Understanding (or Identity Recognition, Exception Detection, or the Like)

A sensing module sends consecutive frame information of a detected target of interest to the module through continuous processing of a video. The module further analyzes the information, and detects a dangerous state.

6. Alarm Intervention

After a danger signal is detected in operation 5, the system sends an alarm, to notify relevant personnel to handle the site, thereby preventing further deterioration of a hazardous condition.

Visual target tracking is an important guarantee for real-time running of the intelligent video surveillance system. The method provided in this patent is used for a target tracking part of intelligent video surveillance, and a drift generated in a target tracking process is found and detected in time, and accurate target information of interest may be further sent to a next module, to ensure normal running of an intelligent video surveillance system.

The foregoing scenario examples are merely two relatively typical application scenarios in many application scenarios. It may be learned from the foregoing scenario examples that, the method and apparatus provided in this application may be applied to all products that may use visual target tracking, such as an unmanned vehicle, a vehicle-mounted multi-sensor fusion sensing device including a visual detection apparatus, an intelligent monitoring apparatus, and a smartphone. Specifically, the method provided in this application may be deployed on a computing node of a vehicle-mounted visual perception device, and performance of a visual tracker is improved through software reconstruction, to improve overall visual output performance. It should be noted that this is merely used as an example to help readers understand a product form of this application, and is not intended to limit product implementation in this application.

Figure 10:
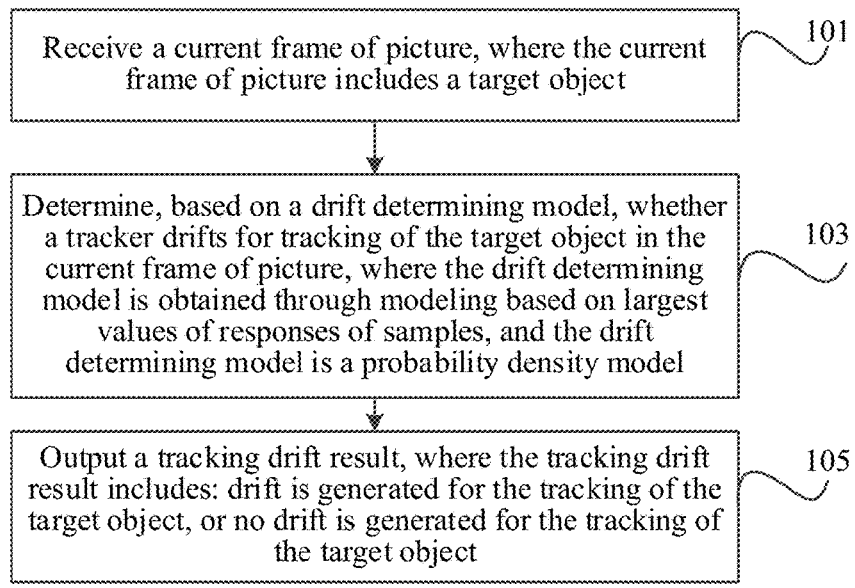
FIG. 10 is a schematic flowchart of a target tracking method according to an embodiment of this application.

The following describes a target tracking method 100 in this application with reference to FIG. 10.

S101. Receive a current frame, where the current frame includes a target object.

The current frame described herein is a frame of picture in a video sequence, instead of an isolated picture. The current frame may be obtained usually by using a video camera at a fixed frequency.

S103. Determine, based on a drift determining model, whether a tracker drifts for tracking of the target object in the current frame, where the drift determining model is obtained through modeling based on largest values of responses of samples; the drift determining model is a probability density model; the sample is a training sample used to train the drift determining model, where the training sample is collected from a training picture, and the training picture includes the target object; and the response value of the sample is a probability value of likelihood that the training sample is the target object in the training picture.

It should be noted that, the probability density model may be specifically presented in a form of a probability density function. The probability density function is used to intuitively describe a continuous random variable (where the function is referred to as a distribution law in a case of a discrete random variable), and indicates a probability that an instantaneous amplitude falls within a specified range. Therefore, the probability density function is a function of an amplitude. A probability in a continuous sample space case is referred to as a probability density. When a quantity of tests is infinitely increased, a histogram approaches a smooth curve, and an area surrounded by the curve represents a probability. The curve is a probability density function of this test sample.

In mathematics, a probability density function (which may be referred to as a density function for short without confusion) of a continuous random variable is a function describing a possibility that an output value of the random variable is close to a specific determined value. A probability that a value of the random variable falls within a range is an integration of the probability density function within the range.

In this embodiment of this application, the determining, based on a drift determining model, whether a tracker drifts for tracking of the target object in the current frame is specifically determining whether a largest response value of each sample falls within an interval constructed based on the probability density function, where a range of the interval herein may be set based on a specific precision requirement, and is not limited herein. For content related to the probability density model below, also refer to the explanation herein. To avoid redundancy, details are not described again.

The tracker outputs a position of the target in the current frame. In this application, for the position that is of the target in the current frame and that is output by the tracker, the drift determining model is used to determine whether the position is accurate, that is, whether the position is a real position of the target in the current frame, to be specific, a specific meaning of whether drift is generated during tracking. It should be noted that the target tracking method in this application may be integrated into a conventional tracker, so that in addition to a conventional tracking function, the target tracking method in this application further has a drift detection function and even a drift correction function that is mentioned below in this application. Certainly, the target tracking method in this application may alternatively be implemented as a new module, where the new module is mounted on a conventional tracker, or the new module may separately work with the conventional tracker. This is not limited in this application.

For "the drift determining model is obtained through modeling based on largest values of responses of samples" mentioned in S103, it should be noted that the drift determining model described herein is specifically used to perform drift determining, or drift detection, on a tracking result. That is, the model is used to determine or detect accuracy of the tracking result. The drift determining model may be trained by a server in advance for later use. Certainly, when a terminal is capable of performing model training, the terminal may alternatively train the drift determining model for later use. A training process mainly includes collecting a training sample in a training picture. Usually, this sampling process is performed within a particular range around a target coordinate position in the training picture. A search window may be preset for this range. A center of the search window is usually a center of a target position box in a previous frame of picture. A search window size is in direct proportion to a target size, different shapes may be defined for different search windows. The search window may be rectangular, circular, or of any other shape that can implement a function of the search window. Then, a sampling box may be slid in various directions within the search window, to form a batch of samples. A size and a shape of the sampling box herein are the same as those of the target position box in a previous frame of picture. In practice, in addition to the foregoing manner, a multi-scale sampling manner may further be used for sampling. That is, the target position box in the previous frame of picture is scaled at a specific ratio (including a plurality of proportions) to obtain a sampling box, and then sampling is performed based on the multi-scale sampling box. There are other sampling manners in practice, and details are not described in this application. After a batch of samples is obtained through sampling, feature extraction is performed on each of the samples. Common features include a histogram of oriented gradient (HOG), a local binary pattern (LPB) feature, a combination of a plurality of features, and the like. After feature extraction, each sample has its own feature representation. Then, a classifier computes the feature representation of each sample, to obtain a response value of each feature representation. That is, each sample corresponds to a plurality of response values, and the largest value of the response values is a largest response value of the sample. A position that is of the sample and that corresponds to the largest response value of the sample is a position at which the target is most likely to appear on the training picture. Each training sample has one largest sample response value, and many samples have many largest sample response values. The drift determining model in this application is obtained through modeling based on these largest sample response values.

S105. Output a tracking drift result, where the tracking drift result includes: drift is generated for the tracking of the target object, or no drift is generated for the tracking of the target object.

In this embodiment of this application, whether the tracker drifts for the tracking of the target object in the current frame is determined based on the drift determining model. The drift determining model is obtained through modeling based on the largest values of the responses of the samples. Therefore, a drift status of the tracker can be quickly detected, to provide fast and accurate input for timely drift correction processing.

Based on this embodiment of this application, further, optionally, before the determining, based on a drift determining model, whether a tracker drifts for tracking of the target object in the current frame, the method further includes a model training method in S102, specifically including the following operations.

S1021. Receive a first picture, and provide a target coordinate position on the first picture, where the first picture is the first frame of picture.

S1022. Receive a second picture, where the second picture and the first picture are continuous on a time axis, determine a corresponding position in the second picture based on the target coordinate position in the first picture, and perform sampling at a periphery of the corresponding position in the second picture, to obtain N test samples, where N is a positive integer greater than 1.

S1023. Perform feature extraction on each sample in the N test samples, to obtain N feature representations $\{X_1, X_2, \ldots, X_n, \ldots, X_N\}$ that are in a one-to-one correspondence with the N test samples, where n represents an $n^{th}$ sample in the N test samples.

$X_1$ is used to represent a feature representation of the first test sample, and specifically, $X_1$ may include a plurality of features, for example, a histogram of oriented gradient (HOG) and a local binary pattern (LPB) feature. This has been described in detail in the foregoing feature extraction operation of this application, and details are not described herein again.

S1024. Input the N feature representations $\{X_1, X_2, \ldots, X_n, \ldots, X_N\}$ into a classifier to obtain N response values $\{Y_1, Y_2, \ldots, Y_n, \ldots, Y_N\}$ in a one-to-one correspondence with the N feature representations $\{X_1, X_2, \ldots, X_n, \ldots, X_N\}$, where $Y_n=wX_n$, w indicates a core value of the classifier, and $Y_n$ is used to indicate a probability value of likelihood that the $n^{th}$ sample is the target object in the second picture.

In the tracker field, a tracking problem herein is usually converted into a regression problem, that is, Y=wX, where Y is a sample regression value of a sample X, that is, the sample response value described above. A value of the sample response value Y ranges from 0 to 1, and a larger value of Y indicates a higher possibility that X corresponding to Y becomes a target in this frame of picture. w is a core value of the classifier, and is obtained through training after positive and negative sampling is performed on a previous frame of picture. Specifically, when the first frame of picture is received, a target position in the first frame of picture is given, and w is obtained after positive and negative sampling is performed based on the target position. Tracking starts when the second frame of picture is received. After the second frame of picture is tracked, if no drift is generated, a positive sample and a negative sample are sampled again based on a tracking result of the second frame of picture, and w is updated based on this. Then, target tracking of a next frame of picture is performed based on updated w. Operations are performed repeatedly in such a way.

S1025. Perform modeling based on a largest response value $Y_{max}$ in the N response values $\{Y_1, Y_2, \ldots, Y_n, \ldots, Y_N\}$, to obtain the drift determining model.

Each sample corresponds to one sample response value. One training picture has a plurality of samples, that is, has a plurality of sample response values. The largest value in the sample response values is a largest response value of interest, and is also the largest sample response value mentioned above. Modeling is performed based on many largest sample response values of many frames of training pictures, to obtain the drift determining model. Whether drift is generated during current tracking can be rapidly detected by using the model, making important contributions to self-checking of the tracker and subsequent drift correction, thereby greatly improving tracking accuracy of the tracker. In a specific application scenario of the tracker, for example, in the foregoing exemplified self-driving, tracking accuracy can be quickly determined. In this way, effective input information is provided to the planning and control component, to output a more reliable control signal to an unmanned vehicle.

Specifically, the "modeling" described herein may be performed in the following manner: A pre-selected model is initialized. For example, when the pre-selected model is a single-Gaussian model, a largest sample response value of 1 to n (where n may be set to 10 to 15) frames that have been tracked in a previous tracking process is recorded, and a Gaussian model parameter is estimated by using a maximum likelihood method, to complete model initialization. Then, drift detection is performed on subsequent tracking based on the initialized model, and the model is continuously updated and perfected based on a detection result.

Specifically, the determining, based on a drift determining model, whether a tracker drifts for tracking of the target object in the current frame in S103 includes:

determining whether a largest sample response value in the current frame e falls outside a most probable interval constructed by the drift determining model; and if yes, determining that drift is generated; or if not, determining that no drift is generated, where the largest sample response value in the current frame is a largest sample response value in a plurality of sample response values corresponding to a plurality of samples sampled in the current frame.

The drift determining model is a probability density model, and the probability density model is usually presented in a form of a probability density function. Therefore, the most probable interval constructed by the drift determining model is specifically a most probable interval constructed by the probability density function. Specifically, the most probable interval is a preset probability interval. That is, when a requirement for determining precision is relatively high, a range of the interval may be set to be narrower, and a sample whose largest response value does not fall within the interval is determined as a sample generating drift. When the requirement for determining precision is not quite high, the range of the interval may be set to be relatively wide.

Specifically, as shown in FIG. 6, for a series of consecutive pictures, in three pictures in the upper part of FIG. 6, a box in the first frame of picture represents a target coordinate position tracked at a moment t1, and after a period of time (represented by . . . in the figure), a box in the second frame of picture in the figure represents a target coordinate position tracked at a moment t2, a largest response value in the first frame of picture (that is, the moment t1) is $y_{t1}$, and a largest response value in the second frame of picture (that is, the moment t2) is $y_{t2}$. Largest response values such as $y_{t1}, \ldots,$ and $y_{t2}$ corresponding to a series of consecutive moments from the moment t1 to the moment t2 are modeled. Then, a parabolic graph may be obtained by using the built model, specifically as shown in FIG. 6.

In a subsequent tracking process, for example, after a largest response value $y_{t3}$ of a picture frame corresponding to a moment t3 in FIG. 6 is obtained, $y_{t3}$ is matched by using the built model. When $y_{t3}$ falls outside a most probable interval of the parabolic graph of the built model, it is considered that the response value $y_{t3}$ in this case does not belong to the model, and it is considered that the tracker drifts at the moment t3. Further, the drift may be corrected. It should be noted that the most probable interval herein may be preset based on a precision requirement for the tracker. For a tracker with a higher precision requirement, values along an x axis on a parabola are closer to a central axis of the parabola.

After detecting that drift is generated during tracking, that is, when the tracking drift result is that drift is generated for the tracking of the target object, this embodiment of this application further includes a drift correction method in S107. The drift correction method includes a coarse-fine search process, and specifically includes the following operations.

S1071. Obtain a corresponding position in the current frame based on a position of the target object in a previous frame of picture, and establish a plurality of search windows near the corresponding position.

S1072. Collect samples in each of the plurality of search windows to obtain a sample set corresponding to each search window, and compute a sample response value of each sample in the sample set.

S1073. Determine, based on top k sample response values in each search window, a target search window in which the target object is most likely to appear, where the top k sample response values are k sample response values that are ranked top in descending order of sample response values.

S1076. Determine a sampling sample corresponding to a largest sample response value in the target search window as the target object in the current frame.

Optionally, before S1076, the method may further include the following operations.

S1074. Sample the current frame based on the target search window, to obtain a plurality of sampling samples.

S1075. Separately compute sample response values of the plurality of sampling samples to obtain a plurality of sampling sample response values. Correspondingly, S1076 may specifically include: determining a sampling sample corresponding to a largest sample response value in the plurality of sampling sample response values as the target object in the current frame. That is, a position of the sampling sample corresponding to the largest sample response value is a target position obtained through correction.

The determining, based on top k sample response values in each search window, a target search window in which the target object is most likely to appear in S1073 includes:

entering the top k sample response values in each search window into a statistical function, to obtain statistical function values of the top k sample response values, and determining, by comparing the statistical function values of the top k sample response values, the target search window in which the target object is most likely to appear.

Specifically, the entering the top k sample response values in each search window into a statistical function, to obtain statistical function values of the top k sample response values, and determining, by comparing the statistical function values of the top k sample response values, the target search window in which the target object is most likely to appear includes:

$$\hat{z}_j = (\text{argmax or argmin})\varphi(F_1(z_i) \ldots F_k(z_i))$$

where $F_m(.)$ is an $m^{th}$ largest value of response values sorted in descending order in a corresponding response graph $F(.)$, $\varphi(.)$ is a statistical function, and the statistical function may be sum calculation, product calculation, median value calculation, average value calculation, variance calculation (where when the statistical function is variance calculation, a smaller value of the statistical function is preferred), or the like.

The foregoing process of determining the target search window may be considered as a coarse search process. The target search window determined through coarse search is a position at which the target most probably appears. Then fine search, that is, a process of S1074 and S1075, is performed on this basis. Sampling is further performed in the target search window, and a sample corresponding to a largest sample response value is determined, where a position of the sample is the position of the target on the current frame. In this way, drift correction is completed, that is, the incorrect target position is corrected to a correct target position. Principles of the sampling and the process of determining the largest sample response value herein are the same as those of the manners used in the foregoing related parts, and details are not described herein again.

In this way, in this embodiment of this application, the drift generated by the tracker in a target tracking process is detected in time by using the drift determining model, and the drift is corrected in time by using a coarse-fine process, thereby ensuring accuracy of the tracker, providing fast and accurate input information for a downstream device of the tracker, so that the downstream device of the tracker can make more accurate determining.

In another embodiment of this application, further, when the tracking drift result is that no drift is generated for the tracking of the target object, the method further includes a model update method in S108, specifically including: updating the drift determining model based on the tracking drift result.

Further, before the updating the drift determining model based on the tracking drift result, this embodiment of this application may further include the following operation:

S1081. Output the position of the target object in the current frame.

Correspondingly, the updating the drift determining model based on the tracking drift result includes the following operation:

S1082. Update the drift determining model based on the position of the target object in the current frame.

After the position of the target object in the current frame is output in S1081, the current drift determining model may be updated by using a corresponding function corresponding to information about the position, so that accuracy of drift determining by using the current drift determining model is higher.

Specifically, for example, when the selected initial model is a Gaussian model, an update formula may be:

$$\mu_t = (1-\rho)\mu_{t-1} + \rho y_t; \text{ and}$$

$$\sigma_t^2 = (1-\rho)\sigma_{t-1}^2 + \rho(y_t - \mu_t)^2$$

where $(\mu_t, \sigma_t^2)$ is a model parameter updated for a current frame, $(\mu_{t-1}, \sigma_{t-1}^2)$ is a model parameter for a previous frame, and $\rho$ is an update weight, and usually may be 0.01. In this application, the weight $\rho$ gradually decreases, and is set to 1/N, where N is a total quantity of currently tracked frames, and $y_t$ is a largest sample response value of a $t^{th}$ frame of image.

It should be noted that, in this embodiment of this application, an update frequency for updating the model is adjustable. For example, the frequency may be updating the model based on the tracking drift result each time when the tracking drift result is that no drift is generated. Alternatively, the model may be updated based on an accumulated tracking drift result after tracking drift results for several frames are accumulated. The purpose of such processing is: When the update frequency is higher, robustness of the model becomes better after frequent updates. However, frequent updates may consume more computing resources. Therefore, in view of saving computing resources, the update frequency may be adjusted. In this way, update is performed once after a plurality of results are accumulated. That is, in this embodiment of this application, model robustness and computing resource consumption may be balanced based on a specific requirement.

In this embodiment of this application, the drift determining model is updated based on an output result that no drift is generated, so that the drift determining model is adaptive. In addition, a drift detection capability is continuously improved, so that a drift determining (or drift detection) result of the drift determining model is more accurate.

It should be noted that this embodiment of this application is an improvement to the tracker. The target tracking method in this embodiment of this application may be integrated into an existing tracker in a form of a software product, or may be used as an independent module to provide a drift detection and/or drift correction function for an existing tracker. This embodiment of this application is applicable to all types of trackers. Proper basic trackers may be selected based on different tasks, for example, a KCF (kernelized correlation filter) tracker, a CT (compressive tracker), and an STC (spatio-temporal context) tracker. Then, a basic model is further selected to model a historical largest sample response value of a tracker. Common basic models include single Gaussian, Gaussian, and the like. Then, as described above, the basic model is modeled based on a largest sample response value obtained through tracking, that is, a parameter of the basic model is estimated, to complete initialization of the basic model. In a subsequent tracking process, if a tracking result shows that no drift is generated during tracking, the initialized basic model is updated based on the result (where specifically, updating the model is essentially updating the model parameter), and so on. When a tracking result shows that drift is generated during tracking, the drift is corrected by using the drift correction method described in this embodiment of this application.

The method provided in this embodiment of this application is described in detail above with reference to related accompanying drawings. The following describes in detail an apparatus provided in the embodiments of this application with reference to the accompanying drawings.

Figure 11:
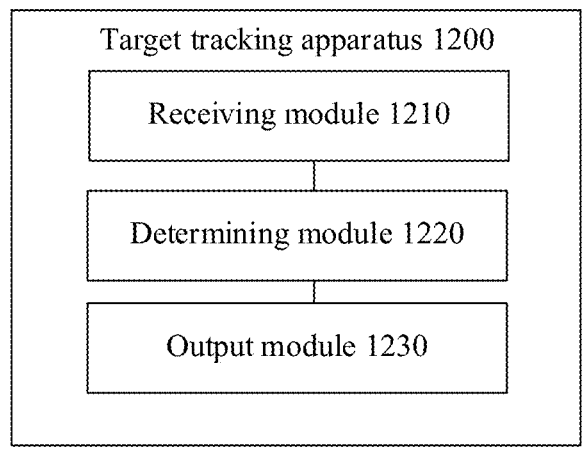
FIG. 11 is a schematic block diagram of a target tracking apparatus according to an embodiment of this application.

FIG. 11 is a schematic block diagram of a target tracking apparatus according to an embodiment of this application. As shown in FIG. 11, the apparatus 1200 includes a receiving module 1210, a determining module 1220, and an output module 1230.

The receiving module 1210 is configured to receive a current frame, where the current frame includes a target object.

The determining module 1220 is configured to determine, based on a drift determining model, whether a tracker drifts for tracking of the target object in the current frame, where the drift determining model is obtained through modeling based on largest values of responses of samples; the drift determining model is a probability density model; the sample is a training sample used to train the drift determining model, where the training sample is collected from a training picture, and the training picture includes the target object; and the response value of the sample is a probability value of likelihood that the training sample is the target object in the training picture.

The output module 1230 is configured to output a tracking drift result, where the tracking drift result includes: drift is generated for the tracking of the target object, or no drift is generated for the tracking of the target object.

It should be understood that the target tracking apparatus 1200 may correspond to the target tracking method 100 in the embodiments of this application, and the target tracking apparatus 1200 may be configured to perform the target tracking method in FIG. 10. In addition, the modules in the target tracking apparatus 1200 and the foregoing other operations and/or functions are separately intended to implement corresponding procedures of the target tracking method in FIG. 10. Specifically, the receiving module 1210 is configured to perform operation 101 in the method 100, the determining module 1220 is configured to perform operation 103 in the method 100, and the output module 1230 is configured to perform operation 105 in the method 100. A specific process in which each module performs the foregoing corresponding operation and a corresponding technical effect have been described in detail in the method 100. For brevity, details are not described herein again.

Optionally, the apparatus further includes a model training module. The model training module is configured to: before the receiving module receives the current frame, receive a first picture, and provide a target coordinate position in the first picture, where the first picture is the first frame of picture;

receive a second picture, where the second picture and the first picture are continuous on a time axis, determine a corresponding position in the second picture based on the target coordinate position in the first picture, and perform sampling at a periphery of the corresponding position in the second picture, to obtain N test samples, where N is a positive integer greater than 1;

perform feature extraction on each sample in the N test samples, to obtain N feature representations $\{X_1, X_2, \ldots, X_n, \ldots, X_N\}$ that are in a one-to-one correspondence with the N test samples, where n represents an $n^{th}$ sample in the N test samples;

input the N feature representations $\{X_1, X_2, \ldots, X_n, \ldots, X_N\}$ into a classifier to obtain N response values $\{Y_1, Y_2, \ldots, Y_n, \ldots, Y_N\}$ in a one-to-one correspondence with the N feature representations $\{X_1, X_2, \ldots, X_n, \ldots, X_N\}$, where $Y_n = wX_n$, w indicates a core value of the classifier, and $Y_n$ is used to indicate a probability value of likelihood that the $n^{th}$ sample is the target object in the second picture; and perform modeling based on a largest response value $Y_{max}$ in the N response values $\{Y_1, Y_2, \ldots, Y_n, \ldots, Y_N\}$, to obtain the drift determining model.

Optionally, the determining module 1220 is specifically configured to:

determine whether a largest sample response value in the current frame falls outside a most probable interval constructed by the drift determining model; and if yes, determine that drift is generated; or if not, determine that no drift is generated, where the largest sample response value in the current frame is a largest sample response value in a plurality of sample response values corresponding to a plurality of samples sampled in the current frame.

The drift determining model is a probability density model, and the probability density model is usually presented in a form of a probability density function. Therefore, the most probable interval constructed by the drift determining model is specifically a most probable interval constructed by the probability density function. Specifically, the most probable interval is a preset probability interval. That is, when a requirement for determining precision is relatively high, a range of the interval may be set to be narrower, and a sample whose largest response value does not fall within the interval is determined as a sample generating drift. When the requirement for determining precision is not quite high, the range of the interval may be set to be relatively wide.

Optionally, the apparatus further includes a correction module. When the tracking drift result is that drift is generated for the tracking of the target object, the correction module is configured to:

obtain a corresponding position in the current frame based on a position of the target object in a previous frame of picture, and establish a plurality of search windows near the corresponding position;

collect samples in each of the plurality of search windows to obtain a sample set corresponding to each search window, and computing a sample response value of each sample in the sample set;

determine, based on top k sample response values in each search window, a target search window in which the target object is most likely to appear, where the top k sample response values are k sample response values that are ranked top in descending order of sample response values; and sample the current frame based on the target search window, to obtain a plurality of sampling samples; and separately compute sample response values of the plurality of sampling samples to obtain a plurality of sampling sample response values; and determine a sampling sample corresponding to a largest sample response value in the plurality of sampling sample response values as the target object in the current frame.

Specifically, for the determining, based on top k sample response values in each search window, a target search window in which the target object is most likely to appear, the correction module is specifically configured to:

enter the top k sample response values in each search window into a statistical function, to obtain statistical function values of the top k sample response values, and determine, by comparing the statistical function values of the top k sample response values, the target search window in which the target object is most likely to appear.

Specifically, the entering the top k sample response values in each search window into a statistical function, to obtain statistical function values of the top k sample response values, and determining, by comparing the statistical function values of the top k sample response values, the target search window in which the target object is most likely to appear includes:

$$\hat{z}_j = (\text{argmax or argmin})_{z_i} \varphi(F_1(z_i) \ldots F_k(z_i))$$

where $F_m(.)$ is an $m^{th}$ largest value of response values sorted in descending order in a corresponding response graph $F(.)$, $\varphi(.)$ is a statistical function, and the statistical function may be sum calculation, product calculation, median value calculation, average value calculation, variance calculation (where when the statistical function is variance calculation, a smaller value of the statistical function is preferred), or the like.

Optionally, the apparatus further includes an update module. When the tracking drift result is that no drift is generated for the tracking of the target object, the update module is configured to update the drift determining model based on the tracking drift result.

Further, before the drift determining model is updated based on the tracking drift result, this embodiment of this application may further include:

outputting the position of the target object in the current frame.

Correspondingly, the updating the drift determining model based on the tracking drift result includes:

updating the drift determining model based on the position of the target object in the current frame.

Figure 12:
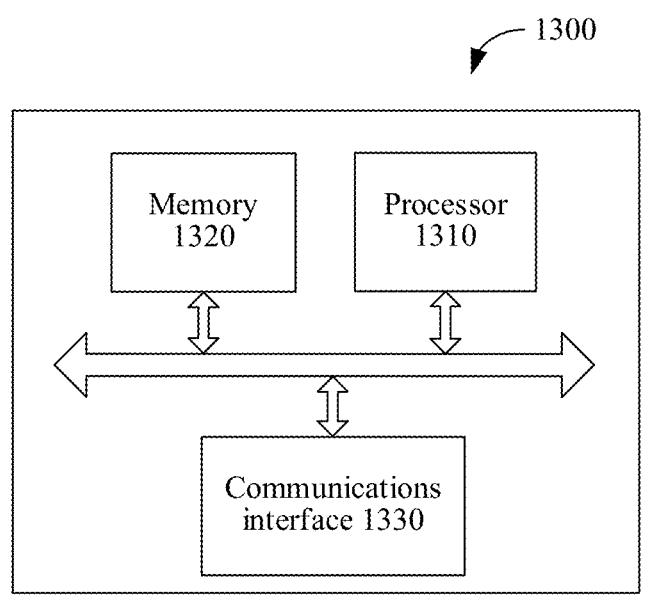
FIG. 12 is a schematic structural diagram of a tracker according to an embodiment of this application.

FIG. 12 is a schematic structural diagram of a tracker 1300 according to an embodiment of this application. As shown in FIG. 12, the 1300 1300 includes a processor 1310, a memory 1320, and a communications interface 1330. The memory 1320 stores an instruction. The processor 1310 is configured to execute the instruction in the memory 1320. When the instruction is executed, the processor 1310 is configured to perform the method provided in the foregoing method embodiment. The processor 1310 is further configured to control the communications interface 1330 to communicate with the outside world.

Specifically, the tracker 1300 may correspond to the target tracking method in the embodiments of this application. The tracker 1300 may include modules configured to perform the method performed by the target tracking apparatus in the target tracking method 100 in FIG. 10. In addition, the modules in the tracker 1300 and the foregoing other operations and/or functions are separately intended to implement corresponding procedures of the target tracking method 100 in FIG. 10. A specific process in which each module performs the foregoing corresponding operation and a corresponding technical effect have been described in detail in the method 100. For brevity, details are not described herein again.

Figure 13:
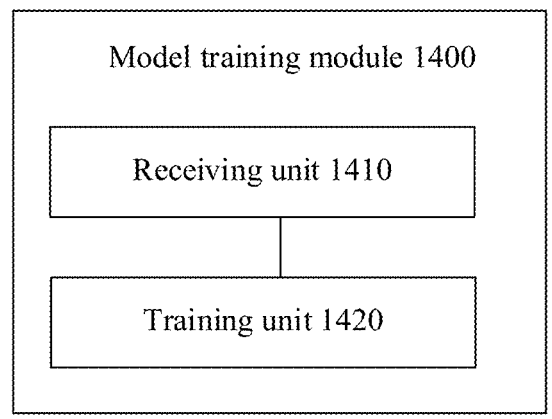
FIG. 13 is a schematic block diagram of a model training module according to an embodiment of this application.

FIG. 13 is a schematic block diagram of a model training apparatus 1400 according to an embodiment of this application. The model training apparatus 1400 is configured to train a drift determining model. As shown in FIG. 13, the apparatus 1400 includes a receiving unit 1410 and a training unit 1420.

It should be understood that the model training apparatus 1400 may correspond to operation 102 of the method for training the drift determining model in the embodiments of this application, and the model training apparatus 1400 may include a unit configured to perform operation 102 of the method for training the drift determining model. In addition, the modules in the model training apparatus 1400 and the foregoing other operations and/or functions are respectively intended to implement corresponding procedures of operation 102 of the model training method. Specifically, the receiving unit 1410 is configured to perform operations S1021 and S1022 in the method S102, the training unit 1420 is configured to perform operations S1023 to S1025 in the method S102. A specific process in which each module performs the foregoing corresponding operation and a corresponding technical effect have been described in detail in operation S102 in the method 100, for brevity, details are not described herein again.

It should be noted that the model training apparatus 1400 and the model training module described above have a same function in this application. A difference lies in that the model training module may be a functional module in the target tracking apparatus, and may be integrated into the target tracking apparatus to complete a corresponding function, or may be mounted on the target tracking apparatus and is electrically connected to the apparatus to perform model training and to output a drift determining model to the target tracking apparatus. The model training apparatus 1400 may be an apparatus independent of the target tracking apparatus, and has its own processor, memory, and the like. Details are described below.

Figure 14:
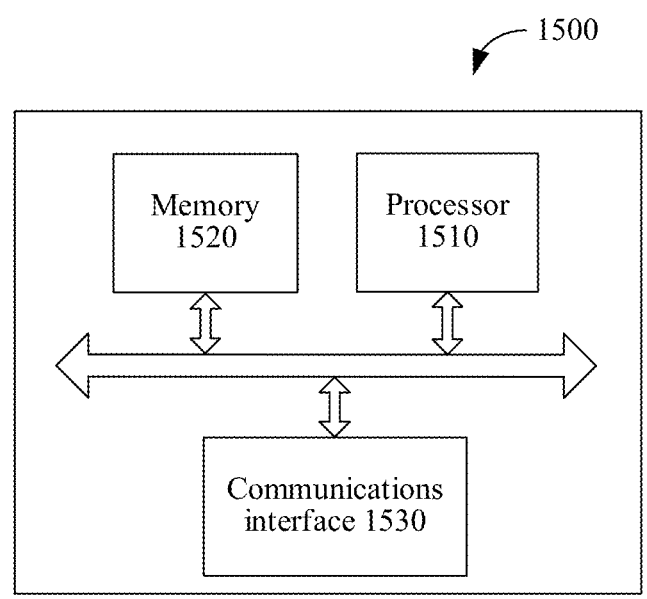
FIG. 14 is a schematic structural diagram of a model training apparatus according to an embodiment of this application.

FIG. 14 is a schematic structural diagram of a model training apparatus according to an embodiment of this application. As shown in FIG. 14, the apparatus 1500 includes a processor 1510, a memory 1520, and a communications interface 1530. The memory 1520 stores an instruction. The processor 1510 is configured to execute the instruction in the memory 1520. When the instruction is executed, the processor 1510 is configured to perform the method provided in the foregoing method embodiment. The processor 1510 is further configured to control the communications interface 1530 to communicate with the outside world.

Specifically, the model training apparatus 1500 may correspond to the model training method S102 in the embodiments of this application. The model training apparatus 1500 may include modules configured to perform the model training method S102 in the target tracking method 100. In addition, the modules in the model training apparatus 1500 and the foregoing other operations and/or functions are respectively intended to implement corresponding procedures of the model training method S102. A specific process in which each module performs the foregoing corresponding operation and a corresponding technical effect have been described in detail in the method S102. For brevity, details are not described herein again.

An embodiment of this application further provides a computer-readable storage medium. The computer-readable storage medium includes a computer program. When the computer program is run on a computer, the computer is enabled to perform the method provided in the foregoing method embodiments.

An embodiment of this application further provides a computer program product including an instruction. When the computer program product is run on a computer, the computer is enabled to perform the method provided in the foregoing method embodiments.

It should be understood that, in the embodiments of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

A person of ordinary skill in the art may be aware that, in combination with the examples described in the embodiments disclosed in this specification, modules and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the apparatus embodiment described above is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented using some interfaces. The indirect couplings or communication connections between the apparatuses or units may be implemented in electrical, mechanical, or another form.

The modules described as separate parts may or may not be physically separate, and parts displayed as modules may or may not be physical units, may be located in one position, or may be distributed on a plurality of network units. Some or all of the units may be selected based on actual requirements to achieve the objectives of the solutions of the embodiments.

In addition, functional modules in the embodiments of this application may be integrated into one processing module, or each of the modules may exist alone physically, or two or more modules are integrated into one module.

When the functions are implemented in the form of a software functional module and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A target tracking method, comprising:
receiving a current frame of picture, wherein the current frame of picture comprises a target object;
determining, based on a drift determining model, whether a tracker drifts for tracking of the target object in the current frame of picture, wherein the drift determining model is a probability density model, and obtained through modeling based on largest values of response values of a sample, wherein the sample is a training sample used to train the drift determining model, and collected from a training picture that comprises the target object, wherein the response value of the sample is a value indicating a probability that the training sample is the target object in the training picture; and
outputting a tracking drift result, wherein the tracking drift result comprises: drift is generated for the tracking of the target object, or no drift is generated for the tracking of the target object.

2. The method according to claim 1, wherein before determining, based on the drift determining model, whether the tracker drifts for tracking of the target object in the current frame of picture, the method further comprises:
receiving a first picture, and providing a target coordinate position in the first picture, wherein the first picture is the first frame of picture;
receiving a second picture, wherein the second picture and the first picture are continuous on a time axis;
determining a corresponding position in the second picture based on the target coordinate position in the first picture;
performing sampling at a periphery of the corresponding position in the second picture, to obtain N test samples, wherein N is a positive integer greater than 1;
performing feature extraction on each sample in the N test samples, to obtain N feature representations $\{X_1, X_2, \ldots, X_n, \ldots, X_N\}$ that are in a one-to-one correspondence with the N test samples, wherein n represents an $n^{th}$ sample in the N test samples;
inputting the N feature representations $\{X_1, X_2, \ldots, X_n, \ldots, X_N\}$ into a classifier to obtain N response values $\{Y_1, Y_2, \ldots, Y_n, \ldots, Y_N\}$ in a one-to-one correspondence with the N feature representations $\{X_1, X_2, \ldots, X_n, \ldots, X_N\}$, wherein $Y_n = wX_n$, w indicates a core value of the classifier, and $Y_n$ is used to indicate a probability value of likelihood that the $n^{th}$ sample is the target object in the second picture; and
performing modeling based on a largest response value $Y_{max}$ in the N response values $\{Y_1, Y_2, \ldots, Y_n, \ldots, Y_N\}$, to obtain the drift determining model.

3. The method according to claim 1, wherein determining, based on the drift determining model, whether the tracker drifts for tracking of the target object in the current frame of picture comprises:
determining whether a largest sample response value in the current frame of picture falls outside a most probable interval constructed by the drift determining model; and
if yes, determining that a drift is generated; or
if not, determining that no drift is generated, wherein the largest sample response value in the current frame of picture is a largest sample response value in a plurality of sample response values corresponding to a plurality of samples sampled in the current frame of picture.

4. The method according to claim 1, wherein when the tracking drift result is that drift is generated for the tracking of the target object, the method further comprises:

obtaining a corresponding position in the current frame of picture based on a position of the target object in a previous frame of picture, and establishing a plurality of search windows near the corresponding position;

collecting samples in each of the plurality of search windows to obtain a sample set corresponding to each search window, and computing a sample response value of each sample in the sample set;

determining, based on top k sample response values in each search window, a target search window in which the target object is most likely to appear, wherein the top k sample response values are k sample response values that are ranked top in descending order of sample response values; and determining a sampling sample corresponding to a largest sample response value in the target search window as the target object in the current frame of picture.

5. The method according to claim 4, wherein before determining the sampling sample corresponding to the largest sample response value in the target search window as the target object in the current frame of picture, the method further comprises:

sampling the current frame of picture based on the target search window, to obtain a plurality of sampling samples; and separately computing sample response values of the plurality of sampling samples to obtain a plurality of sampling sample response values.

6. The method according to claim 4, wherein determining, based on top k sample response values in each search window, the target search window in which the target object is most likely to appear comprises:

entering the top k sample response values in each search window into a statistical function, to obtain statistical function values of the top k sample response values, and determining, by comparing the statistical function values of the top k sample response values, the target search window in which the target object is most likely to appear.

7. The method according to claim 1, wherein when the tracking drift result is that no drift is generated for the tracking of the target object, the method further comprises: updating the drift determining model based on the tracking drift result.

8. A target tracking apparatus, wherein the apparatus comprises:

a receiving module, configured to receive a current frame of picture, wherein the current frame of picture comprises a target object;

a determining module, configured to determine, based on a drift determining model, whether a tracker drifts for tracking of the target object in the current frame of picture, wherein the drift determining model is a probability model, and obtained through modeling based on largest values of response values of a sample, wherein the sample is a training sample used to train the drift determining model, and collected from a training picture which comprises the target object, wherein the response value of the sample is a value indicating a probability that the training sample is the target object in the training picture; and an output module, configured to output a tracking drift result, wherein the tracking drift result comprises: drift is generated for the tracking of the target object, or no drift is generated for the tracking of the target object.

9. The apparatus according to claim 8, wherein the apparatus further comprises a model training module, and the model training module is configured to:

before the receiving module receives the current frame of picture, receive a first picture, and provide a target coordinate position in the first picture, wherein the first picture is the first frame of picture;

receive a second picture, wherein the second picture and the first picture are continuous on a time axis, determine a corresponding position in the second picture based on the target coordinate position in the first picture, and perform sampling at a periphery of the corresponding position in the second picture, to obtain N test samples, wherein N is a positive integer greater than 1;

perform feature extraction on each sample in the N test samples, to obtain N feature representations $\{X_1, X_2, \ldots, X_n, \ldots, X_N\}$ that are in a one-to-one correspondence with the N test samples, wherein n represents an $n^{th}$ sample in the N test samples;

input the N feature representations $\{X_1, X_2, \ldots, X_n, \ldots, X_N\}$ into a classifier to obtain N response values $\{Y_1, Y_2, \ldots, Y_n, \ldots, Y_N\}$ in a one-to-one correspondence with the N feature representations $\{X_1, X_2, \ldots, X_n, \ldots, X_N\}$, wherein $Y_n = wX_n$, w indicates a core value of the classifier, and $Y_n$ is used to indicate a probability value of likelihood that the $n^{th}$ sample is the target object in the second picture; and perform modeling based on a largest response value $Y_{max}$ in the N response values $\{Y_1, Y_2, \ldots, Y_n, \ldots, Y_N\}$, to obtain the drift determining model.

10. The apparatus according to claim 8, wherein the determining module is configured to:

determine whether a largest sample response value in the current frame of picture falls outside a most probable interval constructed by the drift determining model; and if yes, determine that a drift is generated; or if not, determine that no drift is generated, wherein the largest sample response value in the current frame of picture is a largest sample response value in a plurality of sample response values corresponding to a plurality of samples sampled in the current frame of picture.

11. The apparatus according to claim 8, wherein the apparatus further comprises a correction module, and when the tracking drift result is that drift is generated for the tracking of the target object, the correction module is configured to:

obtain a corresponding position in the current frame of picture based on a position of the target object in a previous frame of picture, and establish a plurality of search windows near the corresponding position;

collect samples in each of the plurality of search windows to obtain a sample set corresponding to each search window, and computing a sample response value of each sample in the sample set;

determine, based on top k sample response values in each search window, a target search window in which the target object is most likely to appear, wherein the top k sample response values are k sample response values that are ranked top in descending order of sample response values; and determine a sampling sample corresponding to a largest sample response value in the target search window as the target object in the current frame of picture.

12. The apparatus according to claim 11, wherein the correction module is configured to: before determining the sampling sample corresponding to the largest sample response value in the target search window as the target object in the current frame of picture,
    sample the current frame of picture based on the target search window, to obtain a plurality of sampling samples; and
    separately compute sample response values of the plurality of sampling samples to obtain a plurality of sampling sample response values.

13. The apparatus according to claim 11, wherein with respect to the determining, based on top k sample response values in each search window, of the target search window in which the target object is most likely to appear, the correction module is configured to:
    enter the top k sample response values in each search window into a statistical function, to obtain statistical function values of the top k sample response values, and determine, by comparing the statistical function values of the top k sample response values, the target search window in which the target object is most likely to appear.

14. The apparatus according to claim 8, wherein the apparatus further comprises an update module, and when the tracking drift result is that no drift is generated for the tracking of the target object, the update module is configured to:
    update the drift determining model based on the tracking drift result.

15. A tracker, comprising:
    a processor; and
    a memory;
    wherein the memory stores a computer-readable program; and
    wherein the processor runs the program in the memory, to implement the method according to claim 1.

16. A non-transitory computer-readable storage medium, wherein the computer-readable storage medium stores a computer program, and the computer program enables a device to perform the target tracking method according to claim 1.

* * * * *